United States Patent
Sakayanagi

(10) Patent No.: US 9,971,494 B2
(45) Date of Patent: May 15, 2018

(54) TOUCH SWITCH MODULE

(71) Applicant: KABUSHIKI KAISHA TOYOTA JIDOSHOKKI, Kariya-shi, Aichi-ken (JP)

(72) Inventor: Noriyuki Sakayanagi, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 277 days.

(21) Appl. No.: 14/491,133

(22) Filed: Sep. 19, 2014

(65) Prior Publication Data

US 2015/0089441 A1   Mar. 26, 2015

(30) Foreign Application Priority Data

Sep. 20, 2013  (JP) .................................. 2013-195961

(51) Int. Cl.
*G06F 3/048* (2013.01)
*G06F 3/0485* (2013.01)
*B60K 35/00* (2006.01)
*G06F 3/0488* (2013.01)
*G06F 3/0484* (2013.01)
*G06F 3/0481* (2013.01)
(Continued)

(52) U.S. Cl.
CPC .......... *G06F 3/04855* (2013.01); *B60K 35/00* (2013.01); *B60K 37/06* (2013.01); *G06F 3/0481* (2013.01); *G06F 3/0484* (2013.01); *G06F 3/0488* (2013.01); *B60K 2350/1028* (2013.01); *B60K 2350/1032* (2013.01); *B60K 2350/1052* (2013.01); *G06F 3/03548* (2013.01); *G06F 2203/04808* (2013.01)

(58) Field of Classification Search
None
See application file for complete search history.

(56) References Cited

U.S. PATENT DOCUMENTS 8,537,180 B1   9/2013 Grieve
9,176,652 B1 * 11/2015 Patel ................... G06F 3/04883
(Continued)

FOREIGN PATENT DOCUMENTS

JP   2005-82086 A   3/2005
JP   2012-108572 A   6/2012

OTHER PUBLICATIONS

Nicholas Cravotta, Technology for disabled users: Lessons Learned, May 24, 2001, EDN, vol. 46, 12, p. 59 (Year: 2001).*

(Continued)

*Primary Examiner* — Tam T Tran
(74) *Attorney, Agent, or Firm* — Sughrue Mion, PLLC

(57) ABSTRACT

A touch switch module according to one embodiment comprises a panel, a touch sensor and a control unit. The panel displays a slide bar. The control unit includes a slide velocity detection unit that detects a slide velocity which is a change over time in sliding when the touch moves along the slide bar and an operation information switching unit that compares the slide velocity with a predetermined threshold, that outputs first operation information as the operation information when the slide velocity is below the threshold, and that outputs second operation information that is different from the first operation information as the operation information when the slide velocity is equal to or higher than the threshold.

3 Claims, 5 Drawing Sheets

(51) Int. Cl.
*B60K 37/06* (2006.01)
*G06F 3/0354* (2013.01)

(56) References Cited

U.S. PATENT DOCUMENTS

| | | |
|---|---|---|
| 2007/0265745 A1 | 11/2007 | Styles et al. |
| 2010/0277438 A1 | 11/2010 | Kawashima et al. |
| 2011/0082627 A1* | 4/2011 | Small .............. B60K 35/00 701/48 |
| 2012/0062604 A1 | 3/2012 | Lobo et al. |
| 2012/0139935 A1 | 6/2012 | Miyasaka et al. |
| 2013/0038546 A1* | 2/2013 | Mineo .............. G06F 3/167 345/173 |
| 2013/0082916 A1* | 4/2013 | Dixit .............. G06F 3/011 345/156 |
| 2014/0282224 A1* | 9/2014 | Pedley .............. G06F 3/017 715/784 |

OTHER PUBLICATIONS

Dan Black, Improving Control, Apr. 2008, Process Heating, p. 19 (Year: 2008).*
Communication dated Feb. 2, 2015 from the European Patent Office in counterpart Application No. 14185142.8.

* cited by examiner

TOUCH SWITCH MODULE

BACKGROUND OF THE INVENTION

Field of the Invention

One aspect of the present invention relates to a touch switch module.

Related Background Art

A conventional touch switch module is disclosed in Patent Literature 1. The touch switch module includes a panel, a touch sensor, and a control unit. On the panel, a slide bar for instructing an operation of an electrical equipment is displayed. The touch sensor is an electrostatic capacitive sensor formed on the panel. From the value of voltage generated when a user touches the slide bar with a finger, the touch sensor detects a touch position. The control unit outputs operation information for operating the electrical equipment on the basis of the position.

Patent Literature 2 discloses another touch switch module. This touch switch module includes a slide velocity detection unit. The slide velocity detection unit outputs a slide velocity which is a change over time in sliding when user's touch moves along the slide bar. The output slide velocity is input to a control unit. The control unit outputs operation information according to the slide velocity.

Patent Literature 1: JP 2012-108572 A
Patent Literature 2: IP 2005-82086 A

SUMMARY OF THE INVENTION

However, the touch switch module disclosed in Patent Literature 1 has the following problems. Since the electrical equipment is operated on the basis only of the position at which the user touches the panel with the finger, the operation information tends to vary if, for example, the position at which the user touches the panel with the finger shifts due to vibrations or the like. In this case, it is difficult to stably operate the electrical equipment.

In this respect, with the touch switch module in Patent Literature 2, it is considered to be easy to stably operate the electrical equipment since the electrical equipment is operated on the basis of the slide velocity, compared with the touch switch module of Patent Literature 1. However, Patent Literature 2 does not at all disclose how to operate the electrical equipment on the basis of the slide velocity. Owing to this, even the touch switch module of Patent Literature 2 does not always ensure the improved operability of the electrical equipment.

Such a defect is conspicuous when an electrical equipment is mounted in a vehicle and a driver or the like operates the electrical equipment.

One aspect of the present invention is made in consideration of the above-described conventional circumstances, and it is an object of one aspect of the present invention to provide a touch switch module capable of surely improving the operability of an electrical equipment.

A touch switch module according to one aspect of the present invention is a touch switch module comprising: a panel where a slide bar for instructing an operation of an electrical equipment is displayed; a touch sensor which is formed on the panel, and which detects a touch to the slide bar; and a control unit which is connected to the touch sensor, and which outputs operation information for operating the electrical equipment on the basis of the touch, wherein the control unit includes a slide velocity detection unit that detects a slide velocity which is a change over time in sliding when the touch moves along the slide bar; and an operation information switching unit that compares the slide velocity with a predetermined threshold, that outputs first operation information as the operation information when the slide velocity is below the threshold, and that outputs second operation information different from the first operation information as the operation information when the slide velocity is equal to or higher than the threshold.

In the touch switch module according to one aspect of the present invention, the slide velocity detection unit of the control unit detects the slide velocity which is a change over time in sliding when the touch moves along the slide bar. The operation information switching unit of the control unit compares the slide velocity with the predetermined threshold, outputs the first operation information when the slide velocity is below the threshold, and outputs the second operation information when the slide velocity is equal to or higher than the threshold. The second operation information is different from the first operation information. Therefore, it is possible to stably operate the electrical equipment.

For instance, if a change width of the slide velocity in the case where a position at which a user touches the panel with a finger or the like shifts due to vibrations or the like is assumed as a threshold, it is possible to prevent shift-caused erroneous operation information from being output to the electrical equipment.

Therefore, the touch switch module according to one aspect of the present invention can ensure the improved operability of the electrical equipment.

For the touch switch module according to another aspect of the present invention, various kinds of electrical equipments such as an air-conditioning device, audio equipment or a navigation system can be adopted as the electrical equipment. For example, the electrical equipment may be an electrical equipment for a vehicle.

The touch sensor may be, other than a electrostatic capacitive sensor, a mechanical button, or a surface acoustic wave sensor, an infrared sensor, a resistive film sensor or the like. Furthermore, in another aspect of the present invention, the touch is not limited to the direct touch to the slide bar but also includes nearly touch to the slide bar so that signals can be generated.

The first operation information may change an operating condition of the electrical equipment by a first physical quantity. The second operation information may change the operating condition of the electrical equipment by a second physical quantity larger than the first physical quantity. For instance, if the electrical equipment is an air-conditioning device, the air-conditioning device is instructed to change an indoor target temperature by a first temperature in response to the first operation information. Furthermore, the air-conditioning device is instructed to change the indoor target temperature by a second temperature the absolute value of which is larger than the first temperature in response to the second operation information. In this case, since the operation information switching unit can change the operating condition of the electrical equipment either slightly or greatly depending on the slide velocity, the electrical equipment can be operated under a more preferable condition appropriately reflecting user's intention.

The control unit may include a threshold-UP change unit that changes the threshold to a higher level within prescribed time after the first operation information is output. In this case, hysteresis exists between the slide velocity and the first operation information. Therefore, even if the slide velocity changes in the middle of the slide, the first operation information tends to be output. Therefore, it is possible to stably operate the electrical equipment.

The control unit may include a threshold-DOWN change unit that changes the threshold to a lower level within the prescribed time after the second operation information is output. In this case, hysteresis exists between the slide velocity and the second operation information. Therefore, even if the slide velocity changes in the middle of the slide, the second operation information tends to be output. Therefore, it is possible to stably operate the electrical equipment.

The electrical equipment may be an air-conditioning device for a vehicle. In this case, while a vehicle traveling, a user can suitably adjust a temperature in a vehicle interior.

With the touch switch module according to one aspect of the present invention, the operability of the electrical equipment can be surely improved.

DESCRIPTION OF THE PREFERRED EMBODIMENTS

Hereinafter, an embodiment implementing the touch switch module of the present invention will be described with reference to drawings.

Figure 1:
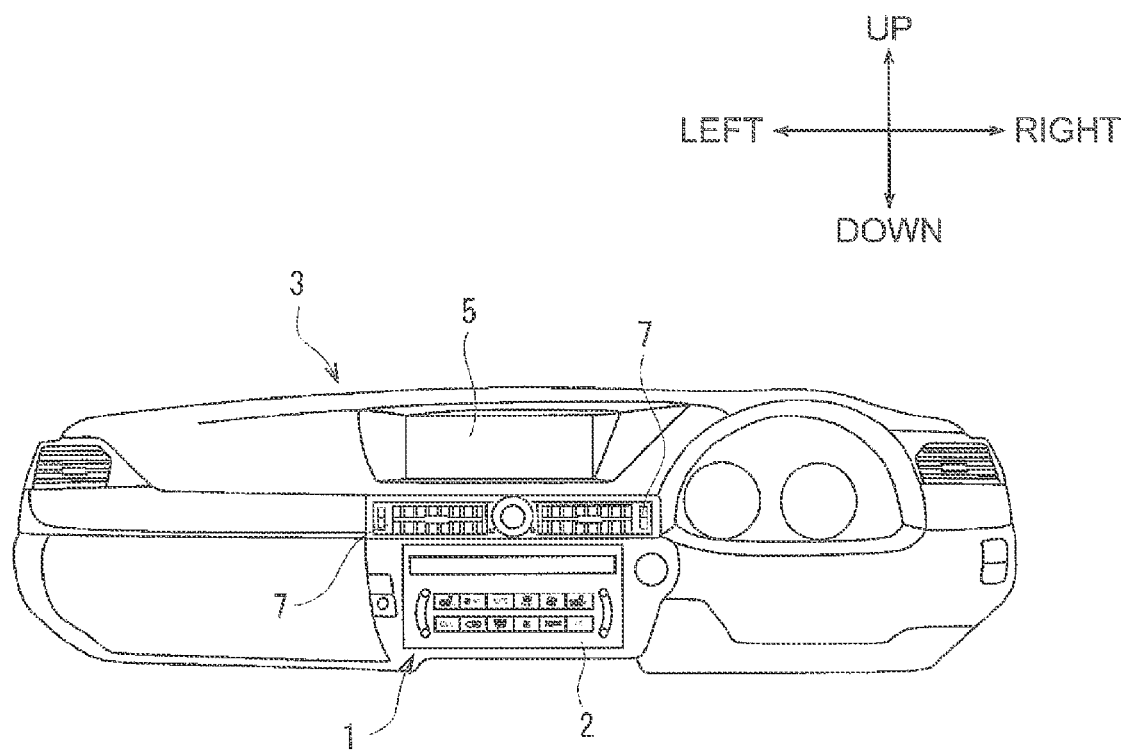
FIG. 1 is a front view of an instrument panel using a touch switch module according to an embodiment.
Figure 3:
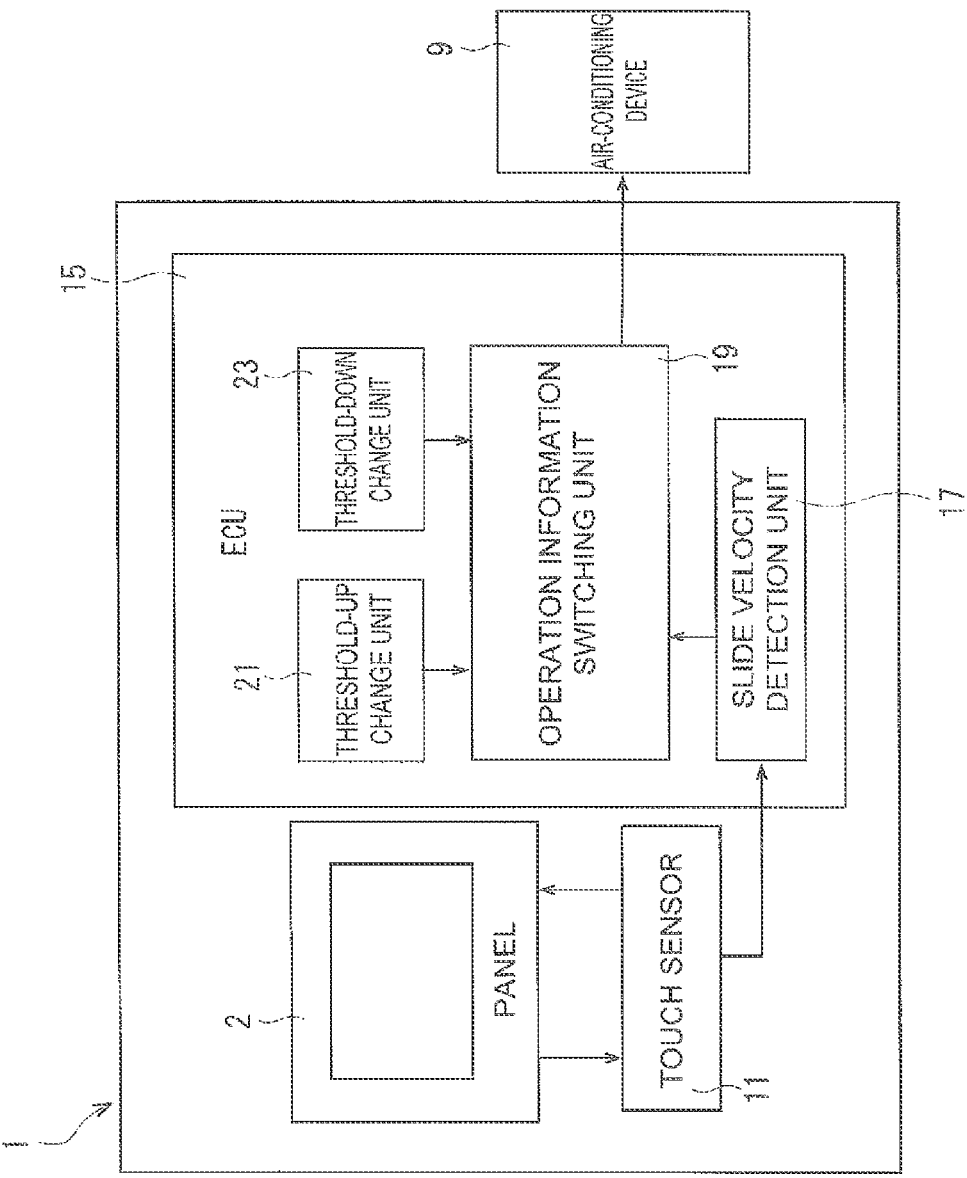
FIG. 3 is a block diagram illustrating the touch switch module according to the embodiment.

As illustrated in FIG. 1 and FIG. 3, an electrical equipment according to the embodiment is an air-conditioning device 9 for a vehicle, and a touch switch module 1 controls the air-conditioning device 9. As illustrated in FIG. 1, the touch switch module 1 is mounted on a lower part of the center of an instrument panel 3 extending to the left and right inside a vehicle interior. The instrument panel 3 includes a car navigation 5 and a center register 7, other than the touch switch module 1.

Figure 2:
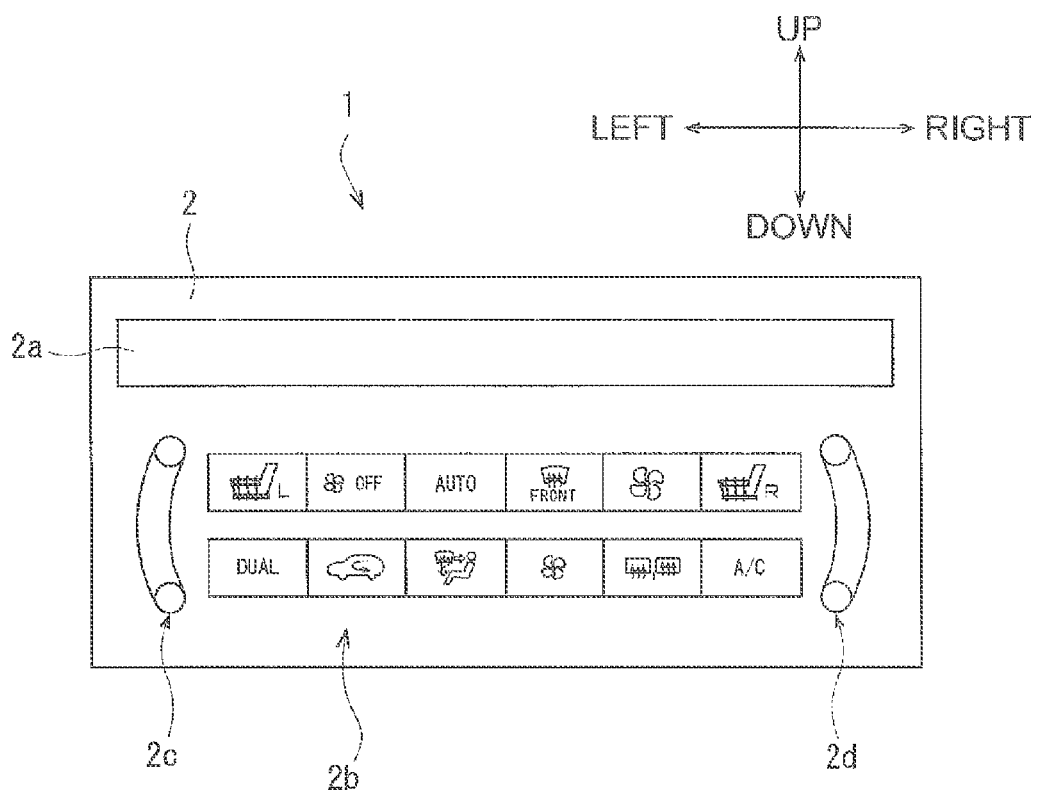
FIG. 2 is a front view of a panel of the touch switch module according to the embodiment.

The touch switch module 1 includes, as illustrated in FIG. 3, a panel 2. On the panel 2, as illustrated in FIG. 2, a display unit 2a is provided, and a plurality of touch pads 2b and left and right slide bars 2c and 2d are displayed.

The display unit 2a is positioned at an upper part of the panel 2, and extends in a vehicle width direction. At the display unit 2a, various items indicating a setting state and a present state of the air-conditioning device 9 are displayed.

The touch pads 2b are displayed in two rows at the lower part of the panel 2. The touch pads 2b have various items to be pressurized with a finger to operate the air-conditioning device 9. The individual items of the touch pads 2b correspond to the various items displayed at the display unit 2a.

The slide bars 2c and 2d are positioned at the left and right of the touch pads 2b so as to be operated with a finger by a passenger at the passengers seat in addition to a driver of the vehicle as the user. By the slide bars 2c and 2d, it is possible to raise and lower a temperature of air blown into the vehicle interior by the air-conditioning device 9.

The touch switch module 1 includes, as illustrated in FIG. 3, a touch sensor 11 and an ECU 15 as a control unit, in addition to the panel 2.

The touch sensor 11 is provided on a back surface of the touch pads 2b and the slide bars 2c and 2d of the panel 2. As the touch sensor 11, an electrostatic capacitive sensor is adopted.

The ECU 15 is connected with the touch sensor 11. In the ECU 15, a program for executing a flowchart illustrated in FIG. 4 or the like is stored. The ECU 15 includes, as illustrated in FIG. 3, a slide velocity detection unit 17 and an operation information switching unit 19. The slide velocity detection unit 17 detects a slide velocity based on a detection result by the touch sensor 11. In the operation information switching unit 19, a threshold $V_S$ is stored. The ECU 15 also includes a threshold-UP change unit 21 and a threshold-DOWN change unit 23.

The user within the vehicle interior operates the air-conditioning device 9 by operating the panel 2 while looking at the various items displayed at the display unit 2a according to the temperature of the vehicle interior. When the user operates the panel 2, the ECU 15 starts the flowchart illustrated in FIG. 4.

In step S1, it is determined whether the user performs a slide. In the present embodiment, the slide means an action that the user touches the slide bar 2c or 2d with a finger and drags the panel along the slide bar 2c or 2d. If it is determined that the user performs a slide, a determination result is YES and processing advances to step S2. In step S2, as initial setting, a notch number is converted to an absolute value. Note that the notch number is a resolution of one slide. The notch number corresponds to the operation information.

In following step S3, the touch sensor 11 detects a position of the finger of the user along the slide bar 2c or 2d. Specifically, the touch sensor 11 detects the position at which the user touches the slide bar 2c or 2d with the finger to the position after the user shifts the finger at every control unit time. The touch sensor 11 calculates a slide distance. Furthermore, the touch sensor 11 detects a direction of dragging, i.e., whether the user drags the panel from up to down or down to up.

In following step S4, the slide velocity detection unit 17 of the ECU 15 illustrated in FIG. 3 detects a slide velocity $V_X$. Specifically, the slide velocity detection unit 17 calculates a difference between the time of detecting the position when the user touches the slide bar 2c or 2d with finger and the time of detecting the position after the user shifts the finger as elapsed time. The slide velocity detection unit 17 then detects the slide velocity $V_X$ from the slide distance and the elapsed time.

Figure 4:
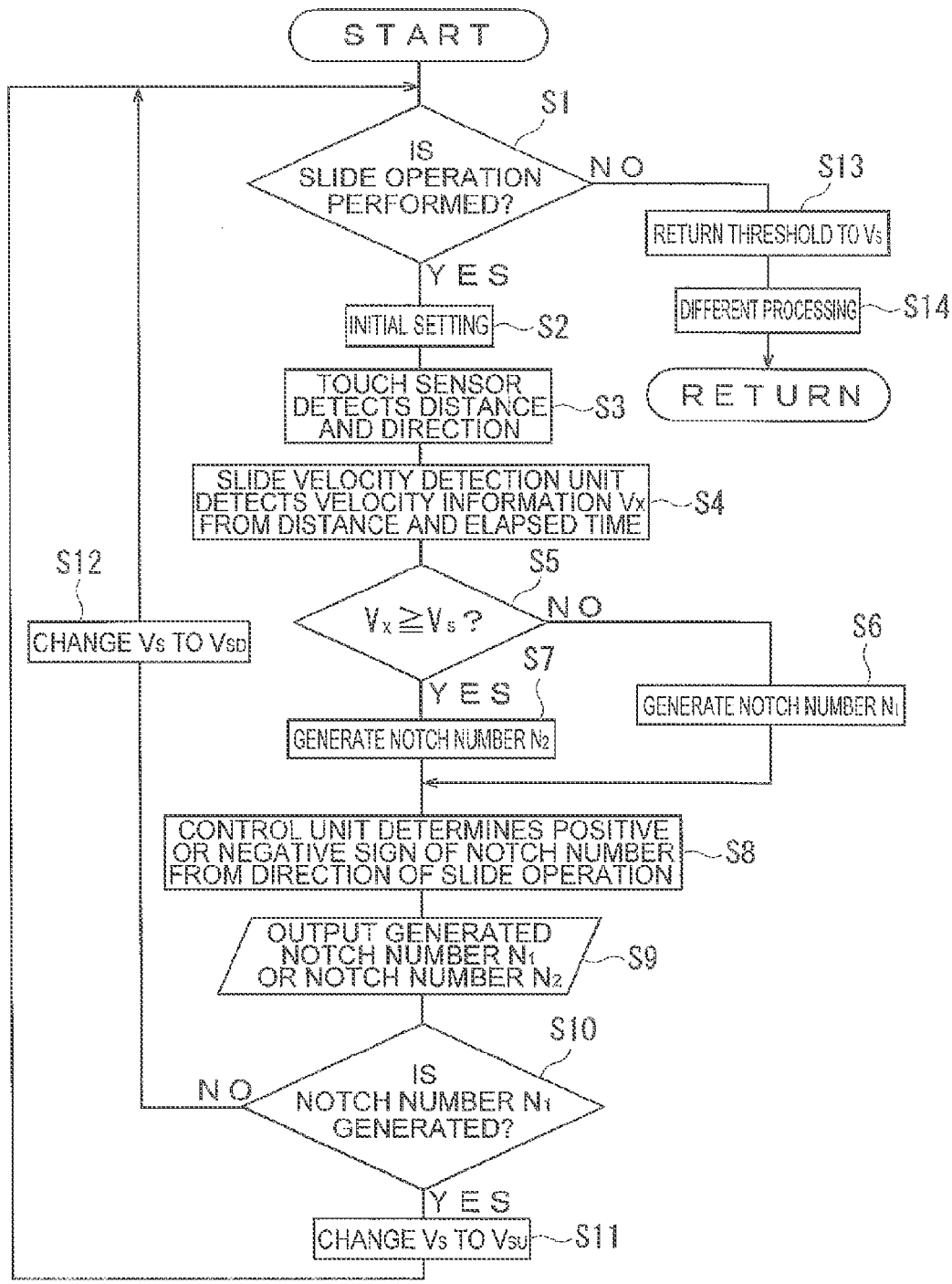
FIG. 4 is a flowchart of a case of operating a panel, in relation to the touch switch module according to the embodiment.

The ECU 15 determines whether the slide velocity $V_X$ is equal to or higher than a threshold $V_S$ in step S5 illustrated in FIG. 4. In step S5, when the slide velocity $V_X$ is below the threshold $V_S$, a determination result is NO and the processing advances to step S6.

Figure 5:
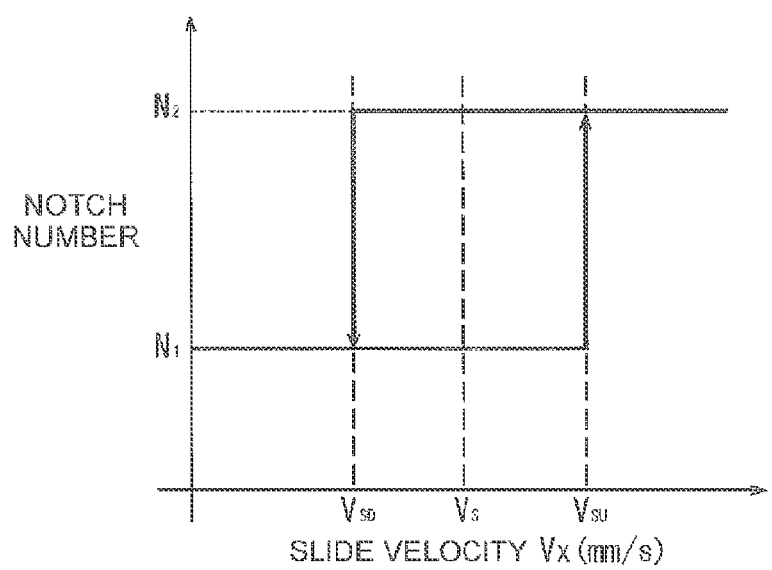
FIG. 5 is a chart illustrating relationship between a notch number and a slide velocity in the case of setting hysteresis, in relation to the touch switch module according to the embodiment.

In step S6, the operation information switching unit 19 illustrated in FIG. 3 generates a notch number $N_1$ illustrated in FIG. 5. The notch number $N_1$ corresponds to the first operation information. A value obtained by multiplying a change temperature by the notch number $N_1$ corresponds to a first physical quantity.

As illustrated in FIG. 4, in step S5, if the slide velocity $V_X$ is equal to or higher than the threshold $V_S$, a determination result is YES and the processing advances to step S7.

In step S7, the operation information switching unit 19 illustrated in FIG. 3 generates a notch number $N_2$ illustrated in FIG. 5. The notch number $N_2$ corresponds to the second operation information. A value obtained by multiplying the change temperature by the notch number $N_2$ corresponds to a second physical quantity.

In following step S8, from the direction of the slide detected in step S3, a sign is determined to be negative if the user drags the slide bar 2c or 2d from up to down and be positive if the user drags the slide bar 2c or 2d from down to up. For instance, if the user drags the slide bar 2c or 2d from up to down, the temperature of the air blown from the air-conditioning device 9 is lowered by the temperature corresponding to the first or second physical quantity. Furthermore, if the user drags the slide bar 2c or 2d from up to down, the temperature of the air blown from the air-conditioning device 9 is raised by the temperature corresponding to the first or second physical quantity.

For the slide, in step S9, the notch number $N_1$ or the notch number $N_2$ generated in step S6 or step S7 is output to the air-conditioning device 9. When the notch number $N_1$ is output to the air-conditioning device 9, the temperature of the air blown from the air-conditioning device 9 changes by the temperature corresponding to the first physical quantity. If the notch number $N_2$ is output to the air-conditioning device 9, the temperature of the air blown from the air-conditioning device 9 changes by the temperature corresponding to the second physical quantity. A condition of the air-conditioning device 9 for achieving temperature change of the air blown from the air-conditioning device 9 corresponds to an operating condition.

If the notch number $N_1$ is generated by the slide, determination result is YES in step S10, and the processing advances to step S11. In step S11, a threshold-UP change unit 21 illustrated in FIG. 3 changes the threshold $V_S$ to a higher level threshold $V_{SU}$. The processing then returns to step S1 illustrated in FIG. 4, and steps S1 to S9 are repeated for the next control unit time.

If the notch number $N_2$ is generated by the slide, a determination result is NO in step S10, and the processing advances to step S12. In step S12, a threshold-DOWN change unit 23 illustrated in FIG. 3 changes the threshold $V_S$ to a lower level threshold $V_{SD}$. Then, the processing returns to step S1 illustrated in FIG. 4, and steps S1 to S9 are repeated. Also, for the threshold $V_{SD}$ and the threshold $V_{SU}$, a plurality of values can be set respectively corresponding to the slide velocity.

In step S1, if it is determined that the slide is not performed, tapping or long press is detected as the user's action. In the present embodiment, the tapping is an action that the user momentarily touches a specific position on the panel 2 with a finger or the like. In the present embodiment, the long press is an action that the user continues to touch the specific position on the panel 2 with a finger or the like for prescribed time. In step S1, if it is determined that the slide is not performed, the determination result is NO, and the processing advances to step S13.

In step S13, the present threshold is returned to the threshold $V_S$, and the processing returns to START. In following step S14, the operation information switching unit 19 illustrated in FIG. 3 performs different processing. Specifically, in response to the tapping, the operation information switching unit 19 changes the temperature corresponding to a prescribed notch number. Furthermore, in response to the long press, the operation information switching unit 19 changes the temperature corresponding to the other notch number. When the processing of step S14 ends, the processing returns to START.

In the touch switch module 1, on the basis of the flowchart, the notch number $N_1$ changes the operating condition of the air-conditioning device 9 by the first physical quantity, and the notch number $N_2$ changes the operating condition of the air-conditioning device 9 by the second physical quantity. In other words, the operation information switching unit 19 changes the operating condition of the air-conditioning device 9 slightly or greatly depending on the slide velocity. Therefore, the air-conditioning device 9 can be operated under a more preferable condition appropriately reflecting user's intention.

Moreover, in the touch switch module 1, on the basis of the flowchart, if the notch number $N_1$ is generated repeatedly within the prescribed time, hysteresis is made to exist between the slide velocity and the notch number $N_1$. The hysteresis changes the threshold $V_S$ to the higher level threshold $V_{SU}$. Therefore, even if the slide velocity changes in the middle of the slide, the notch number $N_1$ tends to be generated.

If the notch number $N_2$ is repeatedly generated within the prescribed time, the hysteresis is also made to exist between the slide velocity and the notch number $N_2$. The hysteresis changes the threshold $V_S$ to the lower level threshold $V_{SD}$. Therefore, even if the slide velocity changes in the middle of the slide, the notch number $N_2$ tends to be generated. Owing to this, when the user wants to raise or lower the temperature of the air blown from the air-conditioning device 9 quickly, the temperature can be quickly raised or lowered even if the slide velocity is slightly lowered in the middle of the slide as long as the initial slide velocity is high.

Therefore even if the slide velocity varies, it is possible to stably operate the air-conditioning device 9.

Thus, in the touch switch module 1, the operability of the air-conditioning device 9 for the vehicle can be more surely improved.

While the present invention is described above on the basis of the embodiment, it goes without saying that the present invention is not limited to the embodiment but can be appropriately changed and applied within the scope of the object.

For instance, more pieces of the operation information may be provided such as a notch number $N_3$ and the like in addition to the notch number $N_1$ and the notch number $N_2$.

One aspect of the present invention is available for an air-conditioning device for a vehicle, audio equipment or a navigation system.

What is claimed is:
1. A touch switch module comprising:
   a panel where a slide bar for instructing an operation of an electrical equipment is displayed;
   a touch sensor which is formed on the panel, and which detects a touch to the slide bar; and
   an electronic control unit which is connected to the touch sensor, and configured to output operation information for operating the electrical equipment on the basis of the touch, wherein
   the electronic control unit is further configured to:
   detect a slide velocity which is a change over time in sliding when the touch moves along the slide bar;
   compare the slide velocity with a predetermined threshold, that outputs first operation information as the operation information when the slide velocity is below the threshold, and that outputs second operation information that is different from the first operation information as the operation information when the slide velocity is equal to or higher than the threshold;

change the threshold to a higher level during the sliding, in response to the slide velocity being below the threshold and the first operation information being output; and change the threshold to a lower level during the sliding, in response to the slide velocity being equal to or higher than the threshold and the second operation information being output.

2. The touch switch module according to claim 1, wherein the first operation information changes an operating condition of the electrical equipment by a first physical quantity, and the second operation information changes the operating condition of the electrical equipment by a second physical quantity larger than the first physical quantity.

3. The touch switch module according to claim 1, wherein the electrical equipment is an air-conditioning device for a vehicle.

* * * * *